United States Patent [19]

Reinhardt

[11] 3,908,469
[45] Sept. 30, 1975

[54] ROTATIONAL SPEED MEASURING DEVICE, PARTICULARLY FOR ROTARY CASTING INSTALLATIONS AND THE LIKE

[75] Inventor: Eugen Reinhardt, Villingen, Germany

[73] Assignee: Ernst Reinhardt GmbH, Villingen, Germany

[22] Filed: Feb. 11, 1974

[21] Appl. No.: 441,515

[30] Foreign Application Priority Data
Feb. 13, 1973 Germany............................ 2306905

[52] U.S. Cl. ..................... 73/507; 73/527; 324/161
[51] Int. Cl.² ......................... G01P 3/04; G01P 3/44
[58] Field of Search .............. 73/507, 527; 324/161; 425/429, 430

[56] References Cited
UNITED STATES PATENTS
2,447,209   8/1948   Rendel et al................... 324/161 X 3,810,727   5/1974   Pivar.................................. 425/430

FOREIGN PATENTS OR APPLICATIONS
338,400   10/1972   U.S.S.R............................. 425/429
1,167,072   4/1964   Germany .......................... 324/161

Primary Examiner—James J. Gill
Attorney, Agent, or Firm—Waters, Schwartz & Nissen

[57] ABSTRACT

A tachometer or rotational speed measuring device for a machine element and, more particularly, for the form carrier plate of a rotary casting installation, which carries out rotational movements about two mutually angularly offset axes, and which is rotatable about both axes through separately controllable drive installations incorporating coaxially extending drive shafts.

7 Claims, 2 Drawing Figures

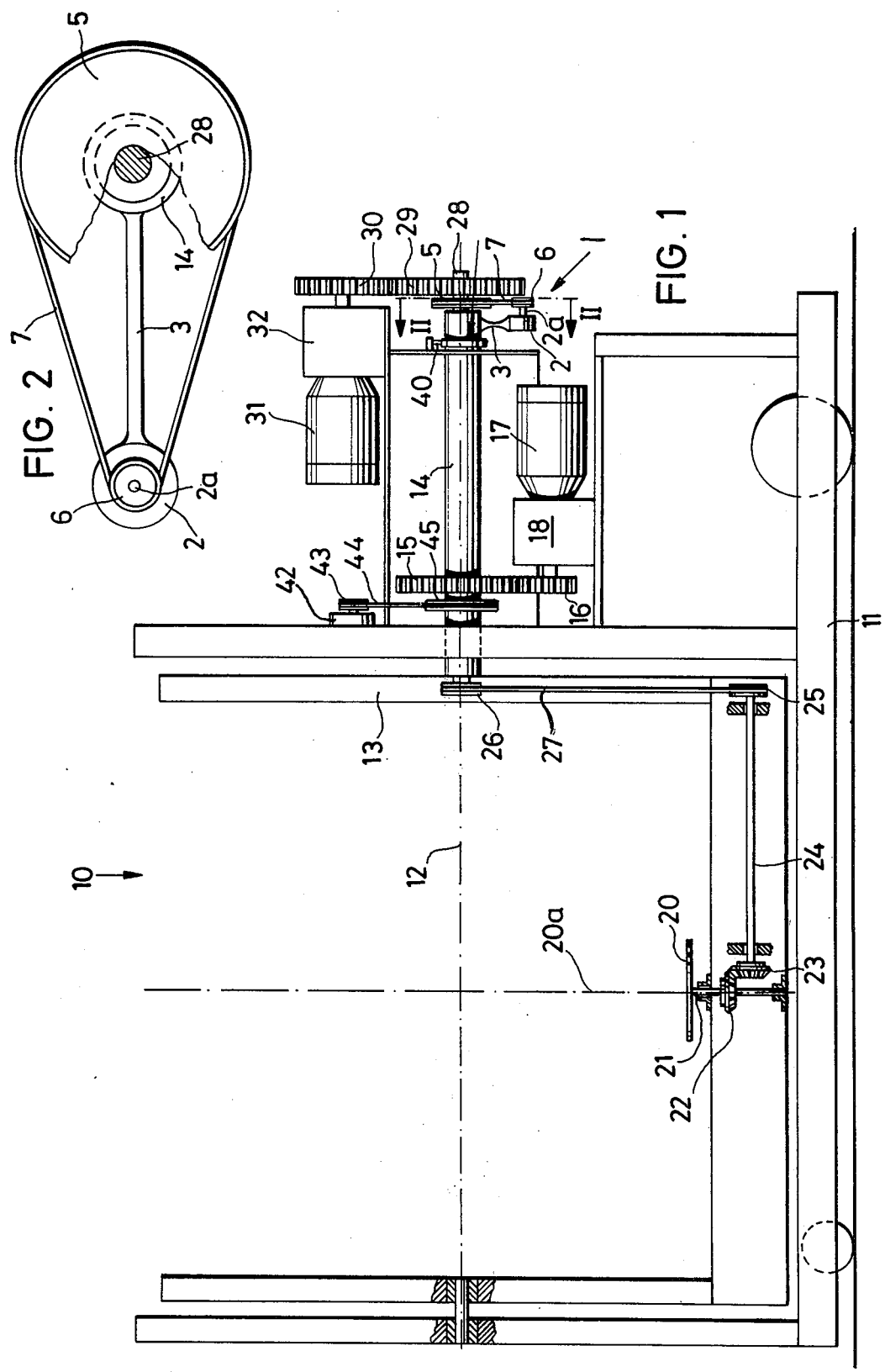

ROTATIONAL SPEED MEASURING DEVICE, PARTICULARLY FOR ROTARY CASTING INSTALLATIONS AND THE LIKE

FIELD OF THE INVENTION

The present invention relates to a tachometer or rotational speed measuring device for a machine element and, more particularly, for the form carrier plate of a rotary casting installation, which carries out rotational movements about two mutually angularly offset axes, and which is rotatable about both axes through separately controllable drive installations incorporating coaxially etending drive shafts.

The plate-like constructed form carrier plate of the rotary casting installation is, for example, supported within a rotary frame which is pivotable about a horizontal main axis so as to be, in addition rotatable about a further axis which extends perpendicularly to the rotary frame axis.

Since both of the rotational movements imparted to the form carrier are oppositely superimposed, heretofore, it has not been possible to indicate the rotational speed of the inherent rotation of the form carrier in relationship to the rotary frame through the use of a tachometer or rotational speed measuring device.

DISCUSSION OF THE PRIOR ART

Until now, it has been the usual procedure to measure the rotational speeds of both drive installations and then, giving consideration to the transmission ratios of intermediately located drive elements, to ascertain the inherent rotational speed of the form carrier in an approximation by using suitable graphs or mathematical tables. This prior art rotational speed measuring method is quite complicated, and includes the danger of committing recording errors.

In order to obtain precise rotary casting components, and particularly to enable the maintaining of constant wall thicknesses and the like therefor, it is desirable that the rotational speed about both rotating axes be precisely known at all times, and capable of being controlled or, in effect, regulated.

SUMMARY OF THE INVENTION

Accordingly, it is an object of the present invention to provide a tachometer or rotational speed measuring device for measuring the inherent rotation of a form carrier which is located interiorly of a rotary casting installation, and which device constantly delivers an accurate measured value.

Inventively, the foregoing object is attained in that, through the intermediary of a drive arrangement, a rotary speed differential between the proportional rotating speeds of the coaxial drive shafts is conveyed to a measuring instrument.

The present invention is derived from the knowledge that the rotational speed of the form carrier about its own rotational axis, in comparison with the rotary frame, is directly proportional to the rotational speed differential between the two coaxial drive shafts. If these rotational speed differentials are transmitted to a measuring instrument, a measured value is obtained which is a function of this sought-of form carrier rotational speed. The measurment of the rotational speed of the rotary frame may follow, in a known manner, from these drive shafts or, in effect, from the drive arrangement of the installation.

Preferably, the measuring instrument may comprise a tachometer-generator, including a housing which is rigidly connected with one of the drive shafts, and whose shaft is coupled through a suitable drive with the other drive shaft. This tachometer-generator then transmits an electrical signal which is proportional to the inherent rotational speed of the form carrier, for example, through the employment of slip ring contacts.

For driving purposes there may be utilized, for example, a suitable belt drive, a chain drive, or a planetary gear drive arrangement. By employing an intermediate drive arrangement, the rotational speed of the tachometer-generator may be linearly increased to a measurable range.

Furthermore, the measuring instrument may be connected with a suitable indicator device and/or a rotational speed-control installation.

In addition thereto, a stationary tachometer-generator may be employed for effecting the measurement of the rotational speed of the rotary frame of the casting installation.

BRIEF DESCRIPTION OF THE DRAWINGS

Reference may now be had to a preferred exemplary embodiment of the invention, taken in conjunction with the accompanying drawings, in which:

FIG. 1 shows a generally schematic side elevational view of a rotary casting installation including a tachometer or rotational speed measuring device according to the present invention; and FIG. 2 is a sectional view taken along line II—II in FIG. 1, on an enlarged scale, showing details of the rotational speed measuring device.

DETAILED DESCRIPTION

Referring now in detail to the drawings, a tachometer or rotational speed measuring device 1 is associated with a schematically illustrated rotary casting installation 10 which is employed, for example, for the rotary or centrifugal casting of plastic materials. The further hereinbelow detailed description of the rotational speed measuring device 1 serves for measuring the rotational speed of a form carrier or plate 20 about its rotational axis 20a. A casting form (not shown) is fastened onto the carrier plate 20 during the operation of the rotary casting installation 10.

The rotary casting installation 10 includes, as a supporting element, a displaceable housing 11 within which a rotary frame 13 is supported so as to be rotatable about a horizontal axis 12. Concentric with the axis 12, a primary hollow drive shaft 14 supporting a gear wheel 15, is fastened to the rotary frame 13. The gear wheel 15 engages with a gear wheel 16 which is driven by a motor 17 through the intermediary of a drive 18. The hollow drive shaft 14, together with both gear wheels 15 and 16, as well as with motor 17 and drive 18, forms a primary drive arrangement for the form carrier or plate 20, so as to permit the latter to rotate about the horizontal axis 12.

The previously mentioned inherent rotation of the plate 20 about its rotational axis 20a is effected by means of a secondary drive installation which operates through a pair of bevel gears 22, 23, and a shaft 21 which is rigidly fastened to the plate 20, whereby the plate is rotatably supported with respect to the rotary frame 13. The bevel gear 23 is rigidly fastened with a pulley 25 through a shaft 24, wherein the pulley 25 is driven by another pulley 26 through the intermediary of a drive belt 27. The pulley 26, according to FIG. 1, is fastened to an inwardly extending end of a secondary drive shaft 28 which is coaxially located within the hollow drive shaft 14. The secondary drive shaft 28 supports, at its outwardly extending end remote from the rotary casting installation 10, a gear wheel 29 which is in operative engagement with a gear wheel 30, the latter of which is driven by a motor 31 through a drive 32. The secondary drive shaft 28, together with its gear wheels 29 and 30, as well as motor 31 and drive 32, forms a secondary drive installation which, through the drive belt 27, effects the inherent rotation of plate 20 about its axis 20a.

If both drive arrangements are controlled by a suitable control device (not shown) in a manner in which drive shafts 14 and 28 both rotate in the same direction and at identical speeds, then only the rotor frame 13 rotates about its horizontal axis 12, while the plate 20 does not inherently carry out any rotative movement about its axis 20a. Any rotational speed differential between the two drive shafts 14 and 28 causes an inherent rotation of plate 20 in proportion to the direction and extent of this difference in speed. In the herein described embodiment, the transmission ratio for the drive of shaft 21 of plate 20 is so selected that a transmission ratio relationship of 1:1 is obtained. This permits the rotational speed differential between both drive shafts 14 and 28 to be directly proportional to the rotational speed of the plate 20 about its rotational axis 20a.

The rotational speed measuring device 1, shown in section and on an enlarged scale in FIG. 2, senses the rotational speed differential between the two drive shafts 14 and 28 and, by means of a tachometer-generator 2, transmits a measured value which is proportional to the rotational speeds of the plate 20 abouts its rotational axis 20a, predicated on the previously mentioned grounds.

A pulley 5, which is mounted on the secondary drive shaft 28, drives a smaller pulley 6 by means of a drive belt 7, with the smaller pulley 6 mounted on a shaft 2a of the tachometer-generator 2. The housing of the tachometer-generator 2, through a carrier or support 3, is rigidly fastened to the primary hollow drive shaft 14, so that the tachometer-generator 2 rotates in unison with the hollow drive shaft 14. It thus becomes readily apparent that the transmission ratio relationship of both pulleys 5 and 6 entirely influences the absolute value of a signal voltage transmitted by the tachometer-generator 2. Independently of this transmission relationship, there always is provided a rotational proportional speed measuring value.

In lieu of the pulley drive arrangement according to FIG. 2, the shaft 2a of the tachometer-generator 2 may also, for example, be connected with the secondary drive shaft 28, by means of a suitable gear drive arrangement.

The electrical signal emanating from the tachometer-generator 2 may be transmitted to an indicator device such as, for example, an electrical indicating instrument, and/or a control installation for maintaining a desired rotational speed of the carrier plate 20.

In order to tap off the electrical signals from the tachometer generator 2, suitable stationary slip ring contacts 40 may be provided, which are adapted to contact slip rings which are mounted on the circumference of the drive shaft 14.

In addition to the measurement of the differential speed between the drive shafts 14 and 18 by means of tachometer-generator 2, it may be desirable to measure the rotational speed of the drive shaft 14 for the rotary frame 13. For this purpose, a second tachometer-generator 42 may be mounted on the housing 11, and which may have a pulley 43 supported on its shaft. A drive belt 44 connects this pulley 43 with another pulley 45, the latter of which is fastened to the circumference of the drive shaft 14.

While there has been shown what is considered to be the preferred embodiment of the invention, it will be obvious that modifications may be made which come within the scope of the disclosure of the specification.

What is claimed is:

1. A device for measuring the speed about a measuring axis of a machine element such as a form carrier plate for a rotary casting installation; comprising means for imparting rotation to said carrier plate about two mutually angularly inclined axes, one of said inclined axes being said measuring axis, said means including separate controllable drive arrangements having coaxially rotatable drive shafts, one of said drive shafts driving said carrier plate about said measuring axis; a drive system through which said one drive shaft drives said carrier plate, the other of said drive shafts driving said carrier plate and said drive system about the other one of said inclined axes; a signal generator and transmission drive means transmitting a rotational speed measuring parameter to said signal generator proportionate to the rotational speed differential between said coaxial drive shafts.

2. A device as claimed in claim 1, said measuring instrument comprising a tachometer-generator having a housing fastened to one of said drive shafts and having a rotor driven by said other drive shaft.

3. A device as claimed in claim 2, said transmission drive means comprising a first pulley fastened to the other of said coaxial drive shafts, a second pulley fastened to a rotor shaft of said tachometer-generator, and belt drive means operatively interconnecting said first and second pulleys.

4. A device as claimed in claim 3, said first and second pulleys being, respectively, sprocket wheels, and said belt drive means being a chain drive interconnecting said sprocket wheels.

5. A device as claimed in claim 1, said transmission drive means comprising planetary means.

6. A device as claimed in claim 1, comprising speed control means for regulating the rotational speed of at least one of said coaxial drive shafts being operatively connected to said measuring instrument.

7. A device as claimed in claim 1, wherein said signal generator provides a measuring value the sign of which depends on the direction of the differential movement between said coaxial drive shafts.

* * * * *